Patented Sept. 20, 1938

2,130,342

UNITED STATES PATENT OFFICE 2,130,342

CONDENSATION PRODUCTS OF AN ALKALI METAL SALT OF TOLUENESULPHONAMIDE WITH FORMALDEHYDE

Hellmuth Hahn and Karl Memminger, Magdeburg-Sudost, Germany, assignors to Fahlberg-List Aktiengesellschaft Chemische Fabriken, Magdeburg-Sudost, Germany, a firm of Germany No Drawing. Application May 16, 1936, Serial No. 80,202. In Germany May 21, 1935

5 Claims. (Cl. 260—3)

According to our invention new valuable condensation products are made by heating an alkali compound of a toluenesulphamide with a substantial excess of formaldehyde in a reflux apparatus for a substantial time, preferably at least 2 hours, and preferably at 100° C.

The condensation products thus obtained, for example from sodium- or potassium para-toluenesulphamide and formaldehyde, are substances similar to thick oils and of a semi-liquid semi-solid character at ordinary temperature and differ from the hitherto known similar condensation products by particular properties of solubility.

The condensation of para-toluenesulphamide with formaldehyde is known. From these substances there are obtained according to the hitherto known conditions of condensation and with a proportion by weight of toluenesulphamide to a 40 per cent solution of formaldehyde of about 1:1, condensation products which at ordinary temperature constitute more or less solid resinous substances and dissolve only incompletely in cold ether and in cold benzene. If the relative proportions of toluenesulphamide to a 40 per cent solution of formaldehyde are altered to about 1:2 there are obtained products of a somewhat more oily character but having frequently a strong tendency to become solid and turbid on standing, this change being accompanied by a further decrease in the solubility in cold ether and in cold benzene.

While the condensation products prepared from para-toluenesulphamide and formaldehyde generally dissolve only incompletely in cold ether and in cold benzene, all condensation products prepared from alkali toluenesulphamides and formaldehyde with a relative proportion by weight of alkali toluenesulphamide to formaldehyde solution of 40 per cent strength of about 1:2 are practically completely soluble in these solvents.

Of particular importance for the possibilities of application of the new condensation products is their practically complete solubility in cold dilute caustic soda solution of about 5 per cent strength, in which the condensation products from para-toluenesulphamide and formaldehyde dissolve only incompletely. It is a further advantage of the invention that the conditions required for the formation of the new condensation products lead to a more rapid and complete reaction than is attained in the condensation of para-toluenesulphamide with formaldehyde under the same conditions.

The production from toluenesulphamide alkali compounds and formaldehyde of new condensation products exhibiting these particular properties is the more surprising because it might have been supposed that the alkali combined with the toluenesulphamide would tend to hinder condensation. Since the new condensation products are practically free from alkali it follows that the alkali in the toluenesulphamide alkali compound must have been split off during the condensation.

The following is an example of the manufacture of the new condensation products in accordance with the invention:

1 part by weight of sodium para-toluenesulphamide and 2 parts by weight of formaldehyde solution of 40 per cent strength are heated together in a reflux apparatus for several hours (for example 4 hours) at 100° C. The reaction mixture is allowed to cool and separates on standing into two layers of which the lower layer, containing the reaction product, is separated. After it has been washed and dried in a vacuum it constitutes a more or less yellow coloured thick oily or tough semi-fluid mass.

The new condensation products are excellently suited among other purposes for the production of textile assistants, particularly those which can be used for imparting wool-like properties to cellulosic artificial fibres.

We claim:

1. A process for the production of condensation products which comprises treating 1 part by weight of an alkali metal salt of toluenesulphonamide with about 2 parts by weight of a formaldehyde solution of 40 per cent. strength for about two hours at about 100° C., allowing the heated mixture to separate into layers, and recovering the lower layer.

2. A process for the production of condensation products which comprises heating 1 part by weight of an alkali metal salt of para-toluenesulphamide with about two parts by weight of formaldehyde solution of 40 per cent. strength at 100° C. for about 4 hours under reflux, then allowing the reaction mixture to stand and cool whereby separation into layers occurs, separating the lower layer, washing and drying it in vacuum.

3. A process for producing condensation products which comprises treating one part by weight of an alkali metal salt of toluenesulphonamide with about two parts by weight of a formaldehyde solution of substantially 40 per cent strength for several hours at about 100° C., allowing the mixture to separate into layers and recovering the lower layer comprising the product.

4. Condensation products of alkali metal salts of toluenesulphonamide and formaldehyde according to claim 3 comprising tough semi-oily, semi-solids which dissolve practically completely in cold diluted solutions of caustic soda of about 5 per cent strength, as well as in cold ether and in cold benzene.

5. Condensation products of alkali metal salts of toluenesulphonamide and formaldehyde according to claim 2 comprising bodies similar to thick oils ranging to semi-solids practically completely soluble in cold ether and in cold benzene.

HELLMUTH HAHN.
KARL MEMMINGER.